United States Patent

[11] 3,564,253

[72] Inventor Arthur G. Buckingham
 Baltimore, Md.
[21] Appl. No. 612,905
[22] Filed Jan. 31, 1967
[45] Patented Feb. 16, 1971
[73] Assignee Westinghouse Electric Corporation
 Pittsburgh, Pa.

[54] SYSTEM AND METHOD FOR IRRADIATION OF PLANET SURFACE AREAS
 1 Claim, 10 Drawing Figs.
[52] U.S. Cl..................................................... 250/85,
 244/1, 250/88
[51] Int. Cl...................................................... H01j 35/00
[50] Field of Search.......................................... 244/155;
 350/293, 295; 250/85, 88; 343/915, 915 (A);
 240/(Inquired)

[56] References Cited
 UNITED STATES PATENTS
 3,220,004 11/1965 Gillespie..................... 244/155
 OTHER REFERENCES
 " Fifth National Conference on the Peaceful Uses of Space," NASA SP-82, Page 75.

Primary Examiner—Archie R. Borchelt
Assistant Examiner—A. L. Birch
Attorneys—F. H. Henson, E. P. Klipfel and D. F. Straitiff ABSTRACT: A system and method for generalized irradiation of relatively large surface areas of a planet, such as the earth, the moon, etc. for illumination, heating, weather control, etc., employing one or more planet-orbiting self-erecting planar-reflector satellites controlled in attitude and orbit position to reflect energy from the sun to a desired area on the planet's surface.

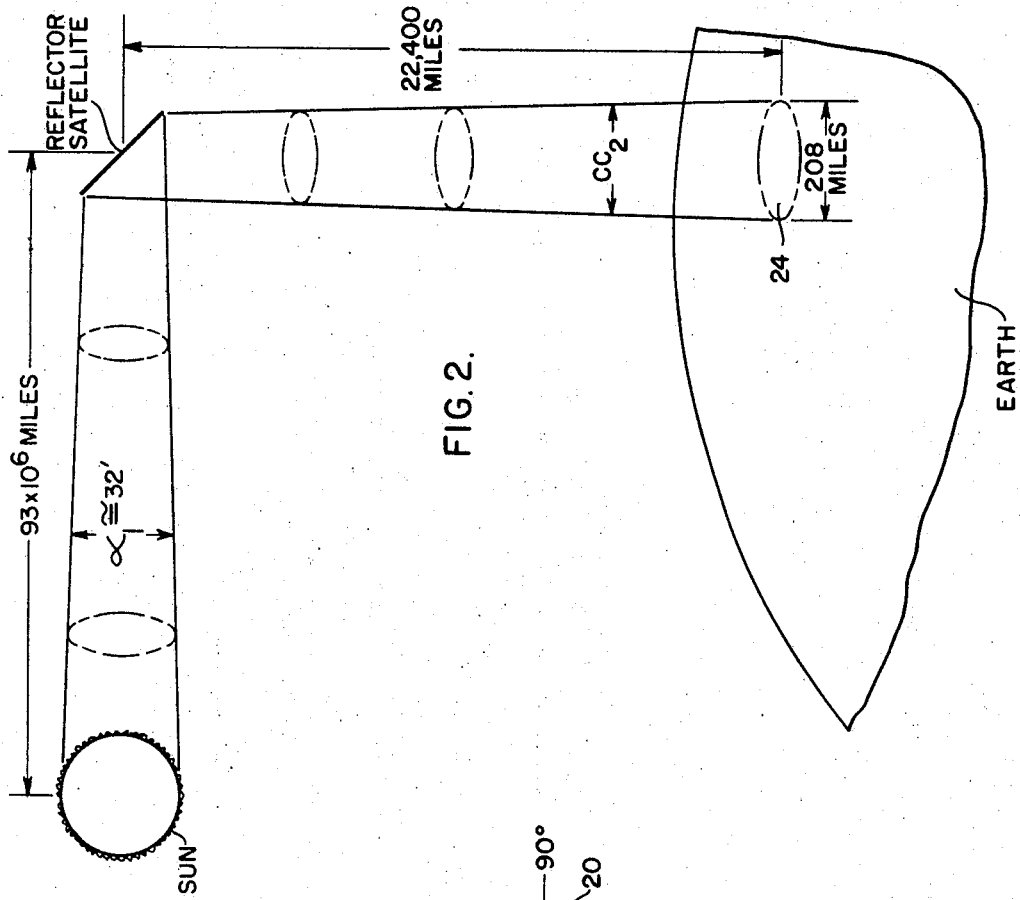
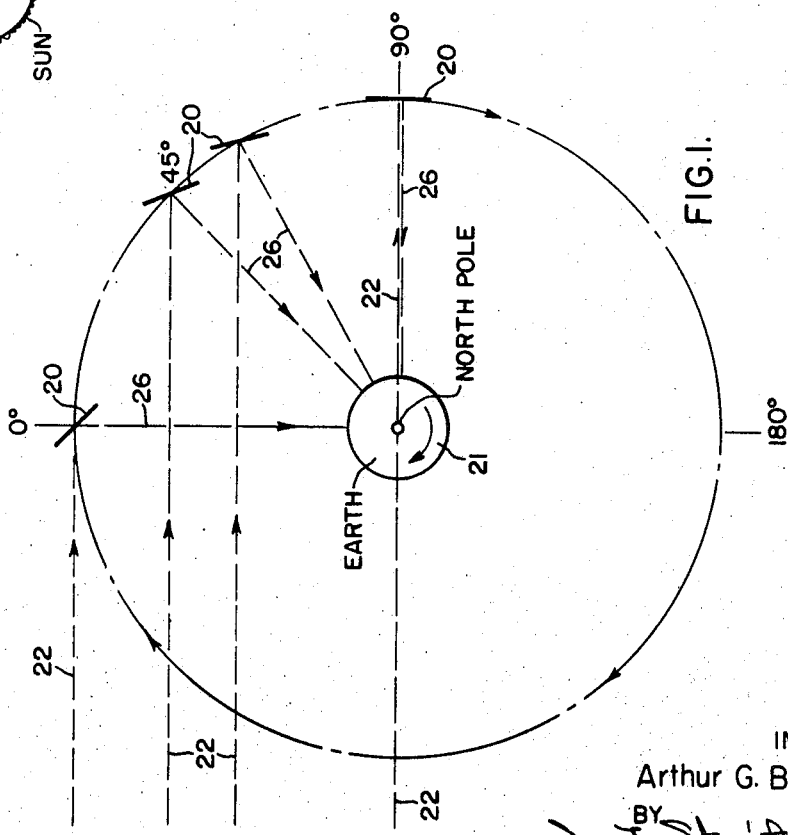

SYSTEM AND METHOD FOR IRRADIATION OF PLANET SURFACE AREAS

BACKGROUND OF THE INVENTION

1. Field of the Invention

Radiation of energy in the form of electromagnetic waves for heating and/or illumination.

2. Description of the Prior Art

Heating and lighting by radiant energy as controlled by man heretofore has been limited either to active systems which produce such energy or to earthbound passive systems which direct solar energy to relatively small areas. Generalized heating and/or lighting of larger areas as thus obtained therefore tends to be expensive and/or impractical.

SUMMARY OF THE INVENTION

In accord with the present invention, generalized illumination and/or heating of an area of a planet, such as the earth, is obtained by reflecting solar energy, or sunlight, onto such area by orbiting planar reflector satellite means orientated by attitude control means to maintain such reflection for prolonged or controlled periods during nighttime and/or daytime.

BRIEF DESCRIPTION OF THE DRAWINGS

FIG. 1 represents schematically a planar reflector satellite orbiting the planet earth in synchronous orbit orientated to direct solar energy to the same area on earth during a period of revolution of the earth on its axis;

FIG. 2 represents schematically the size of a circular area on earth which receives the solar energy from a planar-reflector satellite in synchronous orbit;

DESCRIPTION OF THE PREFERRED EMBODIMENT

The amount of visible light on the earth's surface due to solar illumination has been given as 11,050 lumens/ft.$^2$ of which 9,570 lumens/ft.$^2$ is due to direct sunlight and 1,480 lumens/ft.$^2$ is due to skylight, or sunlight which is reflected from the atmosphere. The amount of visible light impinging on a satellite in space has been given as 12,700 lumens/ft.$^2$. In considering the present invention in terms of illumination on the earth's surface, it would seem that the value of 11,050 lumens/ft.$^2$ can be used as a nominal value which takes into account attenuation of light reflected from outside inwardly through the earth's atmosphere.

As is shown in FIG. 1, a planar-reflector 20 is placed as a satellite into orbit around a planet 21, such as earth, and the angle of the planar-reflector is varied with respect to the sun line 22 as a function of orbit position so as to reflect the sun's image continuously at a desired area on the earth's surface. The approximate diameter of the solar image which is reflected to the earth from any reflector in a synchronous orbit, as shown in FIG. 2 can be expressed as follows:

$D_I = R \sin \alpha = 22,400 \times .00931 = 208.5$ miles
$D^I =$ diameter of illuminated disc
$R =$ image distance $=\cong$ orbital altitude
$\alpha =$ apparent diameter of the sun The apparent diameter of the sun's image has been given as $31' 59.26''$.

The intensity of illumination by a 1,000-ft. diameter planar-reflector in synchronous orbit, of the illuminated area on the earth's surface can be determined as follows:

$$I_D = \frac{D_R^2}{D_S^2} \times 11,050 = \frac{(.19)^2}{(208.5)^2} \times 11,050 = .00915 \text{ lumens/ft.}^2$$

Figure 3:
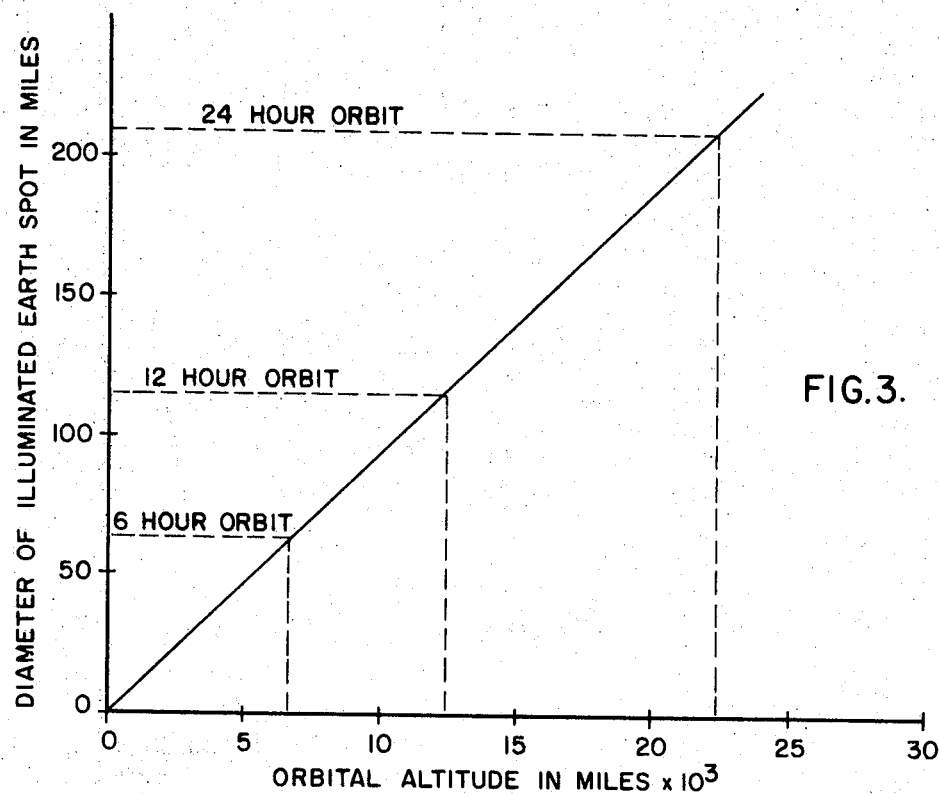
FIG. 3 is a graph showing the relationship between orbital altitude of a planar-reflector satellite and the diameter of the area on earth that would receive sunlight therefrom.
Figure 4:
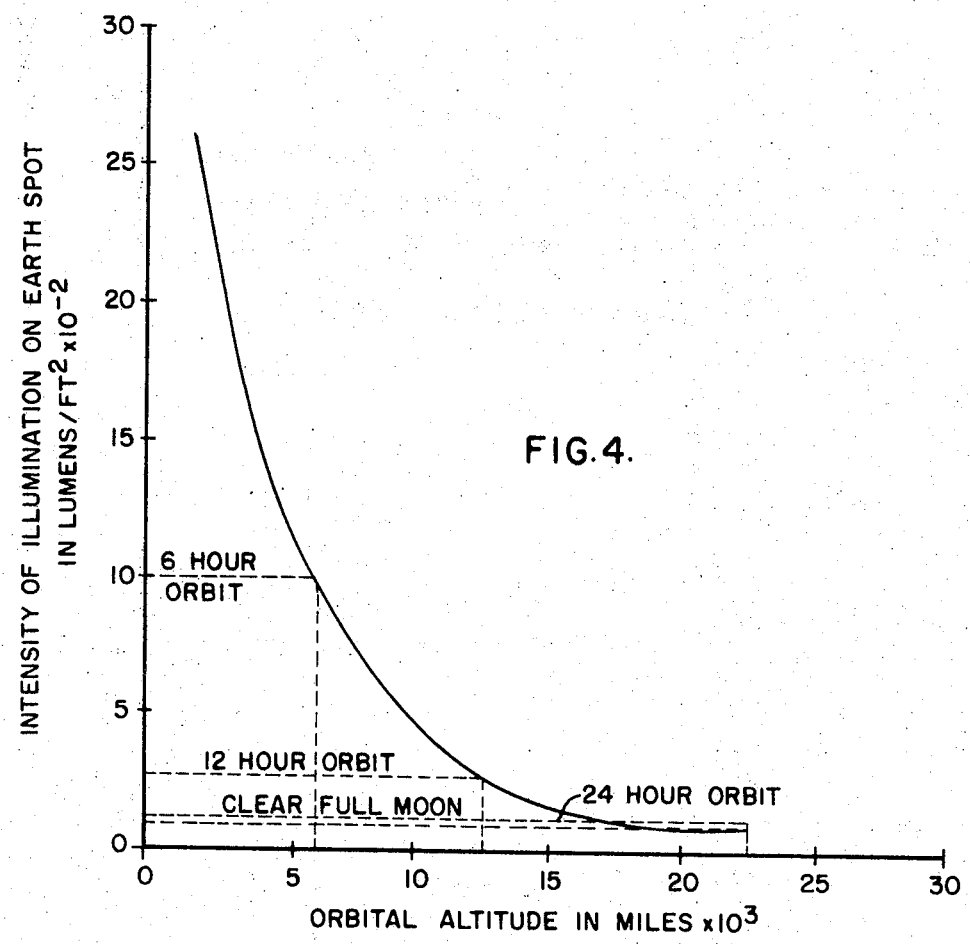
FIG. 4 is a graph showing the relationship between orbital altitude and intensity of solar illumination on an earth area from a satellite having a 1,000-foot diameter planar-reflector surface.

$I_D =$ Intensity of illumination of area
$D_R =$ Diameter of reflector (miles)
$D_S =$ Diameter of illuminated area (miles)
$11,050 =$ Intensity of solar radiation—lumen/ft.$^2$ Thus for any given planar-reflector 20 satellite, as the orbital altitude is decreased, the size of the reflector-illuminated area 24 on the earth's surface is decreased and the intensity of illumination is increased. The approximate variation in the diameter of the illuminated area with image distance is shown in FIG. 3. For a planar-reflector 20 of 1,000-foot diameter, the variation in intensity of illumination with image distance is shown in FIG. 4.

Figure 5:
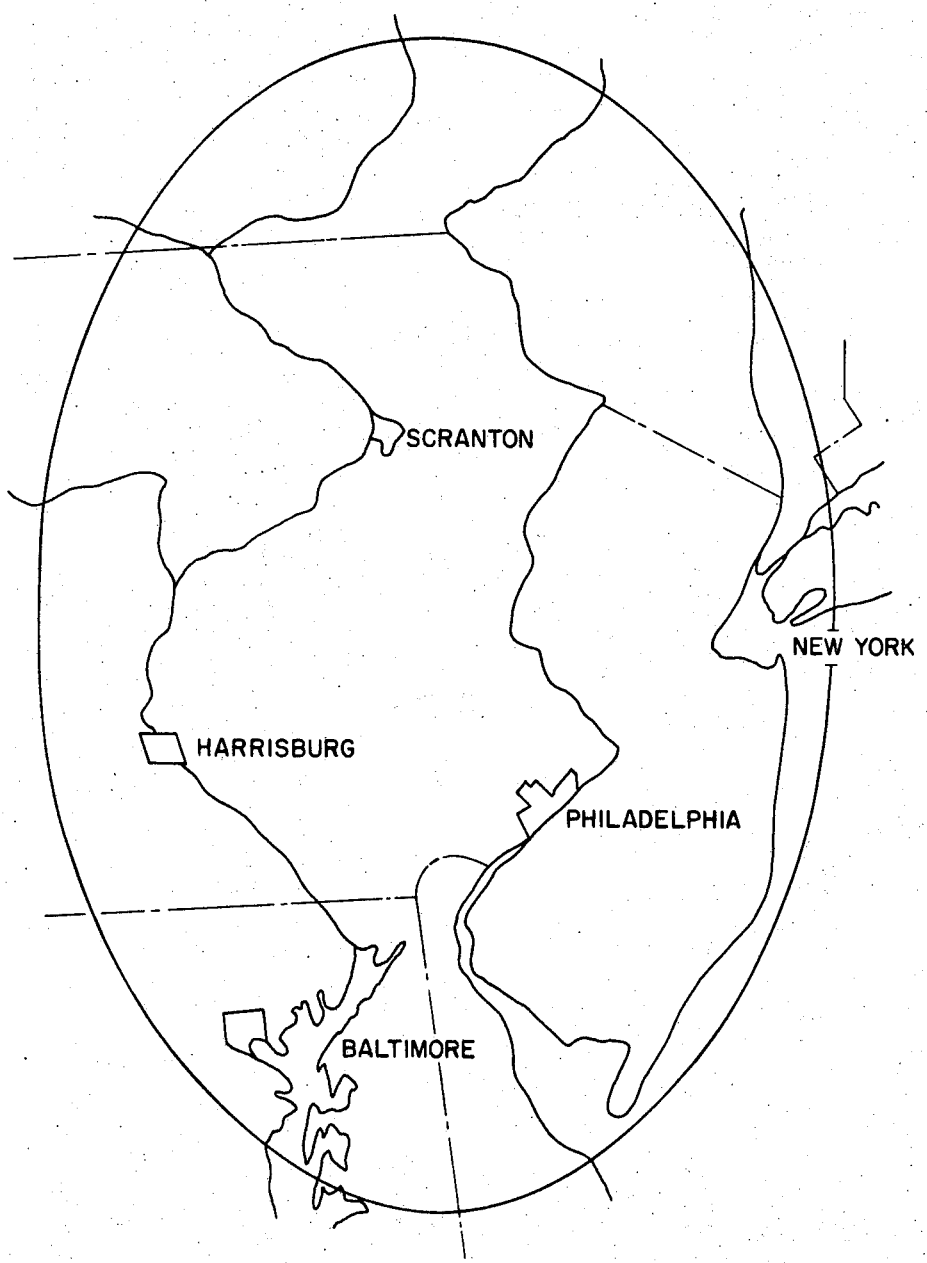
FIG. 5 is a showing on a map of a typical area of the United States which could be made to receive solar radiation via the technique of the present invention.
Figure 6:
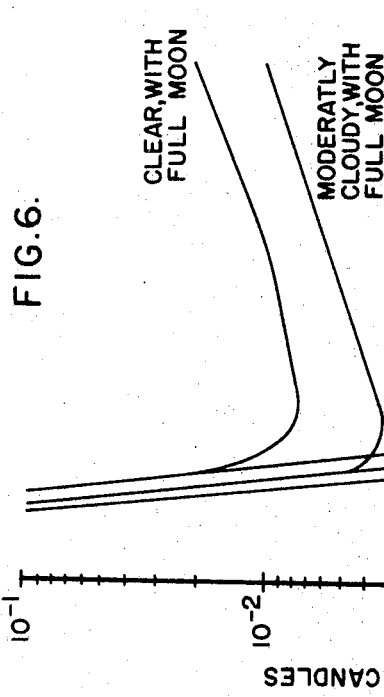
FIG. 6 is a graph showing natural illumination intensities on earth at different times following twilight and under different typical conditions of cloud cover and moon phase.

To gain a physical understanding of the potential lighting effect of a circular planar-reflector 20 satellite 1,000 feet in diameter in a synchronous orbit, the reflector-illuminated area 24 would be approximately as shown in FIG. 5. The intensity of illumination on a clear night would be very close to that of a bright moonlit night. As shown in FIG. 6, the level of illumination at 40° N. latitude under conditions of bright moonlight starts at less than .01 lumens/ft.$^2$ and increases to about .0175 lumens/ft.$^2$. Thus the average value of bright moonlight at 40° N. latitude is more nearly .013 lumens/ft.2. Approximately 10,000 satellites in a synchronous altitude could illuminate the entire mainland of the United States to a level of streetlighting, or about 1 lumen/ft.$^2$.

The effects of cloud cover on the illumination satellite system can also be assessed by referring to FIG. 6. Since the level of illumination provided by a single satellite is about the same level as that of the moon, the effects that cloud cover has on the level of the moon's illumination is of significance to reflector satellite illumination. Referring to FIG. 6, the attenuation in illumination between a clear full moon (.01 lumens/ft.$^2$) and a moderately cloudy night (.005 lumens/ft.$^2$) is about a factor of 2. Referring again to the curves of "Clear—No Moon" and "Heavy Clouds—No Moon," the attenuation of starlight is about a factor of 4. Therefore 3 times as many reflectors would compensate for moderate to heavy cloud cover.

As to heating and weather control, it is well known that a major causative factor in the generation of weather patterns and climate is solar radiation. It would seem then that, if the amount of solar radiation which is received in a given area is varied significantly by satellite reflector means, some variation in the temperature and/or weather patterns will result. A preliminary and necessarily crude estimate of the number of satellites with 100-ft. diameter planar-reflectors 20 required in a synchronous orbit to produce a temperature rise of 1.3° R. in a circular area with a diameter of 208 miles is approximately 12,000 if there is no appreciable mass flow in and out of the area. This radiation intensity represents about one percent of the solar radiation. If the orbital altitude is reduced to 6,000 miles, the same radiation intensity can be generated by approximately 1,000 such reflector satellites, but the area being irradiated is reduced to a disc with a diameter of about 60 miles.

If one thousand 1000-ft. diameter reflector 20 satellites were employed in a 500-mile orbit, the intensity of radiation would be on the order of 1½ times that of the sun, but the duration of heating period would not be greater than about four minutes. In addition the diameter of the area being illuminated would be only five miles. Each planar-reflector 20 of the exemplified size reflects about 100 megawatts, and the energy input into the 5-mile area would be 100 billion watts.

Increasing the number of 1,000-ft. diameter planar-reflector 20 satellites to 10,000 in a 500-mile orbit would permit a heating rate equivalent to about 15 times that of the sun which probably would produce a significant transient temperature rise in the 5-mile diameter area during the 4-minute period. Dropping the orbital altitude down to 321 miles and using 10,000 planar-reflector 20 satellites of the exemplified size increases the energy rate input to 40 times that of the sun on a disc 3 miles in diameter for a period of about a minute. The rate of energy input increases to 5,000 watts/ft.2. The effects of such thermal blasts on a small segment of the atmosphere and/or earth would need further evaluation as would the compromises between the orbital altitude, number and size of reflectors, the total heat input into a given area, the size of the area being heated, the transient temperatures produced, the effects of air mass circulation, the required motions of the satellite, and the approximate costs.

Figure 7:
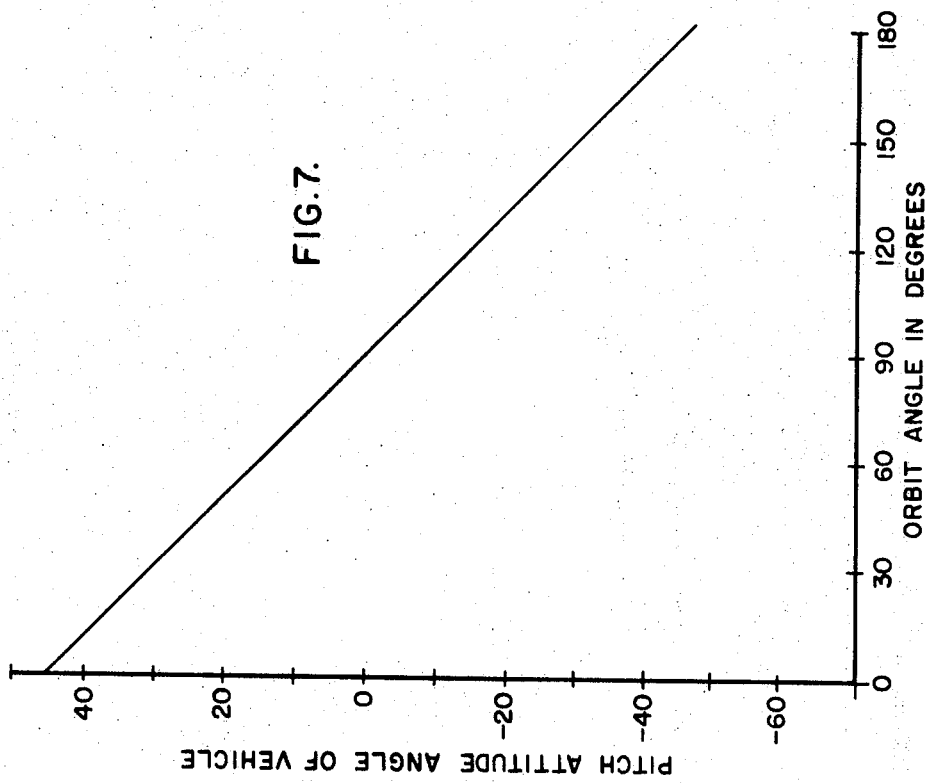
FIG. 7 is a graph showing relationship between the orbit angle and the pitch attitude angle of a planar-reflector satellite in synchronous orbit required to maintain solar energy reflection on the same earth area.

As to attitude control requirements, the basic concept of the present invention is to place planar-reflector 20 satellites into a synchronous or subsynchronous equatorial orbit and vary the angle of the reflector with respect to the sun line 20 as a function of orbit position so as to reflect the sun's image always at the desired point on the earth's surface. In FIG. 1, the same planar-reflector 20 satellite is shown at a various points in a synchronous orbit about the earth in the attitudes required to maintain the desired pointing direction for reflection of solar radiation from sun line 22 to the earth area along the reflection line 26. The attitude change of the planar-reflector 20 in a circular synchronous orbit with respect to orbit position for one-half revolution of the earth, is shown in FIG. 7. For circular synchronous orbit, the reflector 20 satellite must rotate at a uniform rate of approximately 7.5°/hr. with respect to inertial space in order to maintain the desired pointing direction. As the orbit becomes slightly elliptical due to solar pressure effects, this rate will vary slightly.

Figure 8:
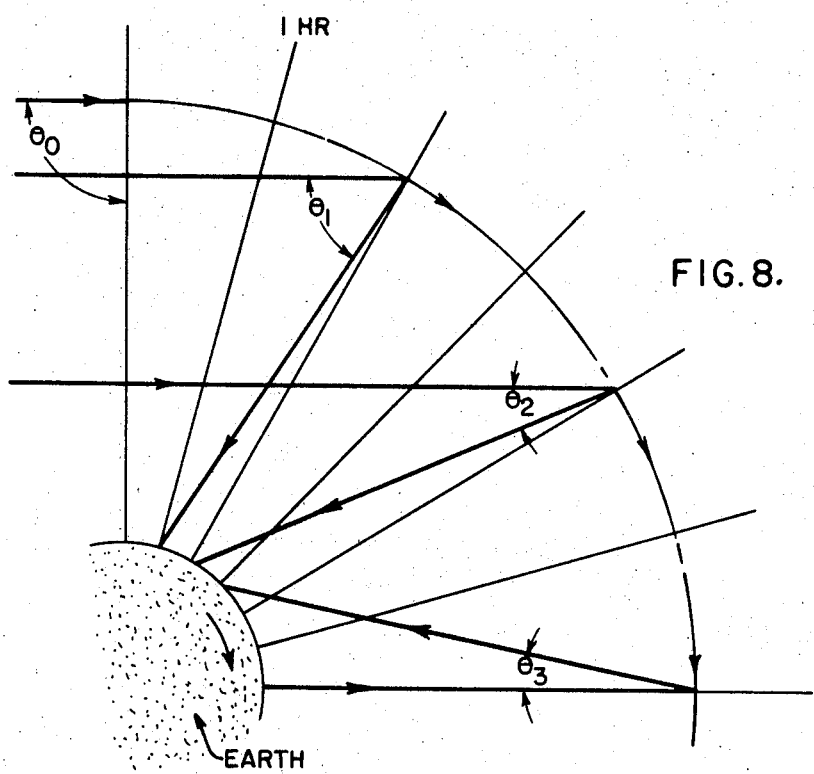
FIGS. 8 and 9 represent schematically optical geometry with respect to reflector satellite position during 12-hour and 6-hour orbits, respectively, and an area on earth toward which the sunlight is reflected.
Figure 9:
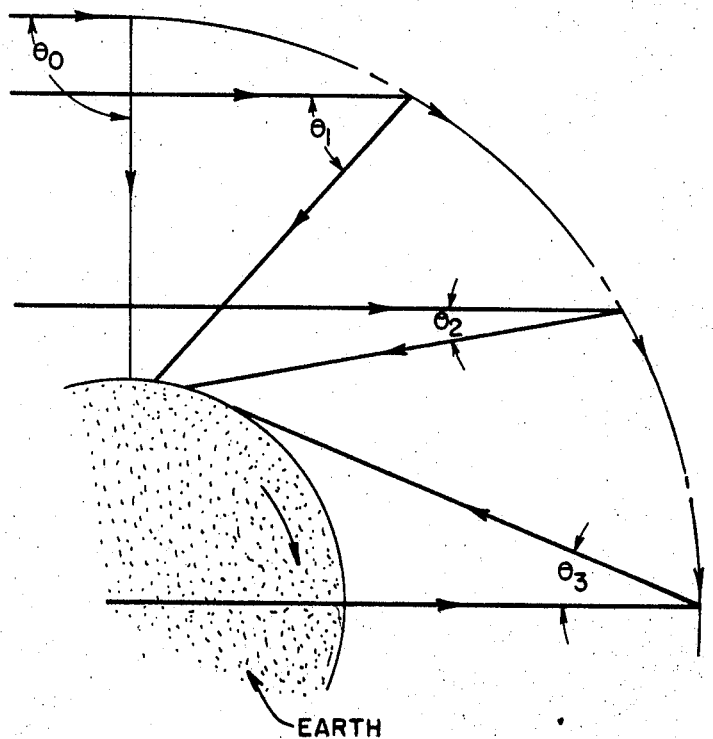

A similar situation exists in a 12-hour orbit except that the angular rate required of the planar-reflector 20 has increased to approximately 17°/hr. as can be seen in FIG. 8. However, as the orbital altitude is further reduced, the effect of the difference in angular rates of the earth and reflector, coupled with a shorter path length of the light beam, causes the required rate of angular attitude change of the vehicle to be nonlinear. As is shown in FIG. 9, in the 6-hour orbit, the rate of change of the pointing direction is greatest when the planar-reflector 20 is directly over the earth spot being illuminated and decreases as it moves away from the earth spot. In the 6-hour orbit, the peak angular rate of the pointing direction is approximately 40°/hr. and drops to about 30°/hr. as the reflector moves out of sight of the earth spot. Consequently, in the higher altitude orbits, there is little torquing requirement brought about by slewing requirements and, in the 6-hour orbit, about 5°/hr. change in angular velocity must be made in an hour to maintain the desired pointing direction. Thus, an angular acceleration capability of 10°/hr./hr. should be more than adequate for orbits of 6 hours or more. In a 500-mile orbit the peak rate may reach 90°/min. with a corresponding acceleration requirement of 90°/min./min.

The pointing accuracy required will depend upon the mission of the reflector. If it were desired to illuminate a particular square mile of area, then a vehicle pointing accuracy of 0.2° would suffice. However, if it were desired to illuminate a two-city area such as Baltimore, Md. and Washington, D.C. from a single synchronous reflector, then a pointing accuracy of approximately 0.1° would be required. Referring to FIG. 5, an inaccuracy of 0.5° CE in the pointing of the reflector vehicle results in an approximate 40-mile shift in the center of the area being illuminated.

ATTITUDE CONTROL SYSTEM OPERATION

Figure 10:
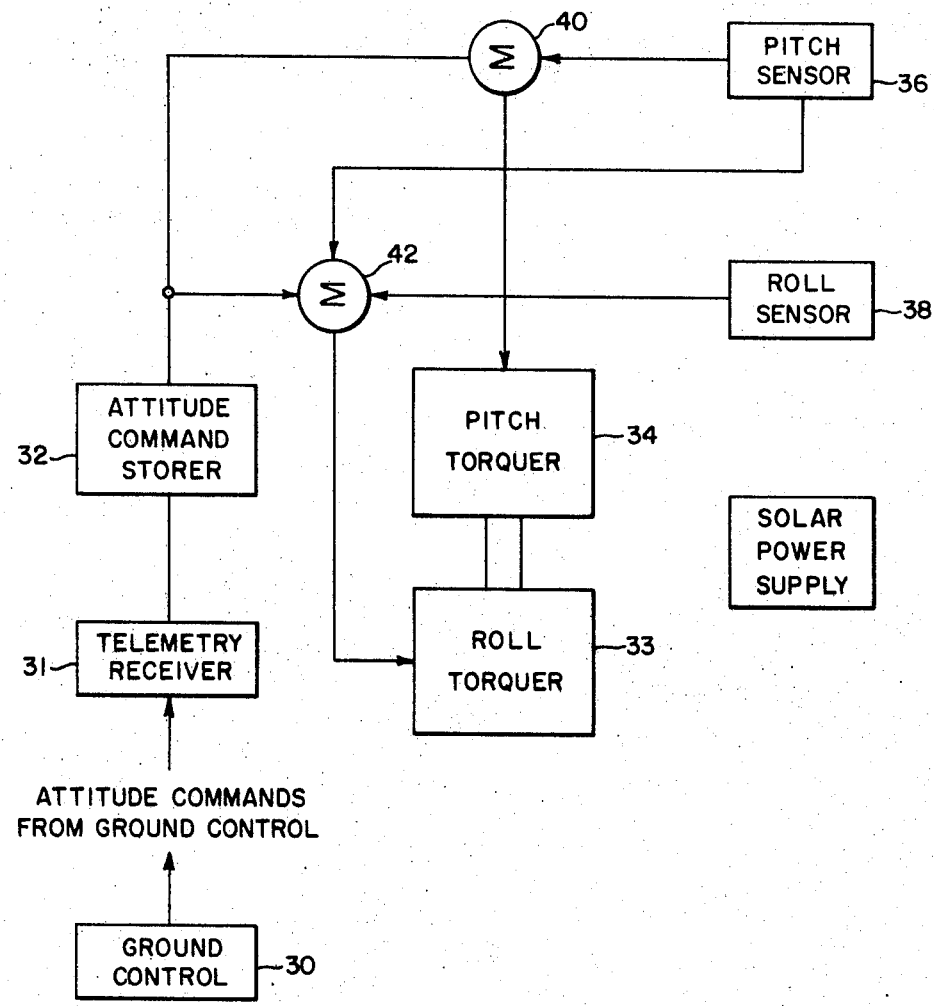
FIG. 10 is a block diagram of an exemplified attitude control system for a reflector satellite employed in accord with the present invention.

A block diagram of an attitude control system for the planar-reflector 20 satellite is shown in FIG. 10. The orbital elements of the reflector satellite will be known from ground tracking stations and these elements will be forwarded to a central computation center for computation of the desired satellite attitude angles as a function of time. After computing the future direction of the sunline and velocity with respect to the satellite from the predicted orbital elements, the required future attitude sensor outputs as a function of time are then computer. These attitude angles as a function of some relatively short time period are transmitted to the satellite from a ground control 30 and stored in an attitude command storage means 22 to be used as reference inputs to the attitude control system as a function of time. This computation, transmission, storage, and use procedure would then be repeated at intervals throughout the useful life of the satellite.

The attitude control system aboard the a satellite, in addition to the telemetry receiver 31 and attitude command storer 32, will comprise a roll torquer 33 for effecting change in satellite attitude with respect to roll, a pitch torquer 34 for effecting change in satellite attitude with respect to pitch, a pitch sensor 36, a roll sensor 38, and summers 40 and 42 to correlate information from the pitch and roll sensors with commands from the storer 32 to control operations of the torquers 33 and 34. Yaw, being defined as rotary movement about the axis perpendicular to the plane surface of the reflector 20, can be ignored, since such yaw will be without effect on aiming of such reflector in a selected direction.

I claim:
1. Apparatus for effecting generalized illumination of a surface area of a planet, comprising a satellite means launchable into orbit around such planet, said satellite means including a compacted membranous solar-energy reflector means unfurlable in space to form a rigidized planar reflector surface, and attitude-changing means for orientating said plane surfaced reflector to intercept solar energy from the sun and reflect same onto a selected area of said planet for a selected period of time during each orbit; said attitude-changing means comprising a ground control means for transmitting attitude command signals, and, on said satellite means, actuator means for changing the attitude of said planar reflector surface, attitude sensor means for sensing attitude of said planar reflector surface with respect to the sun and to said planet, means for receiving and storing the command signals from said ground control means, and means for comparing the received command signals with information from the attitude sensor means to control operation of said actuator means.